(12) United States Patent
Palukuru et al.

(10) Patent No.: US 12,206,802 B2
(45) Date of Patent: Jan. 21, 2025

(54) SHARED HARDWARE SECURITY MODULE

(71) Applicant: FORD GLOBAL TECHNOLOGIES, LLC, Dearborn, MI (US)

(72) Inventors: Venkata Narasimha Sai Srikar Palukuru, Dearborn, MI (US); John Moore, Canton, MI (US); Alekhya Karavadi, Dearborn, MI (US); Michael Dupuis, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 304 days.

(21) Appl. No.: 17/729,272

(22) Filed: Apr. 26, 2022

(65) Prior Publication Data

US 2023/0344654 A1    Oct. 26, 2023

(51) Int. Cl.
H04L 9/32    (2006.01)

(52) U.S. Cl.
CPC ........ H04L 9/3271 (2013.01); H04L 2209/84 (2013.01)

(58) Field of Classification Search
CPC .. H04L 9/3234; H04L 9/3271; H04L 2209/84
See application file for complete search history.

(56) References Cited

U.S. PATENT DOCUMENTS

| | | | |
|---|---|---|---|
| 9,836,308 B2 | 12/2017 | Boenisch et al. | |
| 2016/0344705 A1* | 11/2016 | Stumpf | H04L 9/3213 |
| 2017/0338961 A1* | 11/2017 | Cho | H04L 9/3242 |
| 2019/0068361 A1* | 2/2019 | Ye | H04W 4/48 |
| 2020/0211301 A1* | 7/2020 | Zhang | H04L 63/065 |
| 2020/0213287 A1 | 7/2020 | Zhang et al. | |

* cited by examiner

*Primary Examiner* — Abiy Getachew
(74) *Attorney, Agent, or Firm* — Christopher J. Storms; Brooks Kushman P.C.

(57) ABSTRACT

A system includes a plurality of electronic control units (ECUs) and a shared high security module (sHSM) separate from and connected to the plurality of ECUs over one or more private networks. At least one of the ECUs, over at least one of the plurality of private networks, authenticates a session with the sHSM and requests servicing during the authenticated session. The servicing includes encryption, decryption, or authentication, of a message designated to be handled by the at least one ECU and included in the request for servicing. The sHSM receives the message, performs the requested servicing of the message using capabilities onboard the sHSM, and publishes a serviced version of the message to a designated controller area network bus.

18 Claims, 3 Drawing Sheets

SHARED HARDWARE SECURITY MODULE

TECHNICAL FIELD

The illustrative embodiments generally relate to methods and apparatuses for a shared hardware security module.

BACKGROUND

Security requirements of in-vehicle modules have been ever increasing in recent years to keep advancing vehicle technology secure and safe from intrusion. An electronic control unit (ECU) participating in an original equipment manufacturer's (OEM's) security strategy may need to support a wide range of Security algorithms for controller area network (CAN) based message authentications, ethernet based encryptions (e.g., MACsec, IPsec, TLS) or to secure other wired or wireless network communications. Often, an on-board Hardware Security Module (HSM) included with a given ECU is used to satisfy these security requirements.

While this may be a presently functional solution, the data rates of in-vehicle communications are expected to increase by multiple magnitudes in the coming generations. For an ECU to support security to this extent, the capabilities of its on-board Hardware Security Module (HSM) may need to be quite high.

HSMs are expensive hardware extensions for an ECU. Increased demand in secure communications and strict security timing requirements may require additional security accelerators of the HSMs embedded inside the ECU. Upgrading on-chip HSM or a trusted platform module for each and every ECU in the vehicle may be difficult, if not impossible, because of, for example, pricing constraints, increased chip die size requirements, increasing power requirements and packaging limitations. On the other hand, many ECUs in a vehicle may not be capable of meeting certain increased levels of high security 'performance' requirements without increasing the price per module and may be expressly limited in upgradability by the other factors above, or the like. That is, even if the price were set aside, other constraints may prove to be ultimately and insurmountably constraining with regards to the ability to continually upgrade ECU HSMs.

SUMMARY

In a first illustrative embodiment, a system includes a plurality of electronic control units (ECUs) and a shared high security module (sHSM) separate from and connected to the plurality of ECUs over one or more private networks. At least one of the ECUs is configured to, over at least one of the plurality of private networks, authenticate a session with the sHSM and request servicing, during the authenticated session and including at least encryption, decryption, or authentication, of a message designated to be handled by the at least one ECU and included in the request for servicing. The sHSM is configured to receive the message, perform the requested servicing of the message using capabilities onboard the sHSM, and publish a serviced version of the message to a designated controller area network bus.

In a second illustrative embodiment, a system includes a plurality of electronic control units (ECUs) and a shared high security module (sHSM) connected to the plurality of ECUs over one or more private networks. At least one of the ECUs is configured to, over at least one of the plurality of private networks, authenticate a session with the sHSM and request servicing, during the authenticated session and including at least encryption, decryption, or authentication, of a message designated to be handled by the at least one ECU and included in the request for servicing. The sHSM is configured to receive the message, perform the requested servicing of the message using capabilities onboard the sHSM, and publish a serviced version of the message to a designated controller area network bus.

In a third illustrative embodiment, a system includes a plurality of electronic control units (ECUs) and a shared high security module (sHSM) connected to the plurality of ECUs over one or more private networks. At least one of the ECUs is configured to, over at least one of the plurality of private networks, authenticate a session with the sHSM and request servicing, during the authenticated session and including at least encryption, decryption, or authentication, of a message designated to be handled by the at least one ECU and included in the request for servicing. The sHSM is configured to receive the message, perform the requested servicing of the message using capabilities onboard the sHSM, and send the serviced version of the message back to the at least one ECU.

DETAILED DESCRIPTION

Figure 1:
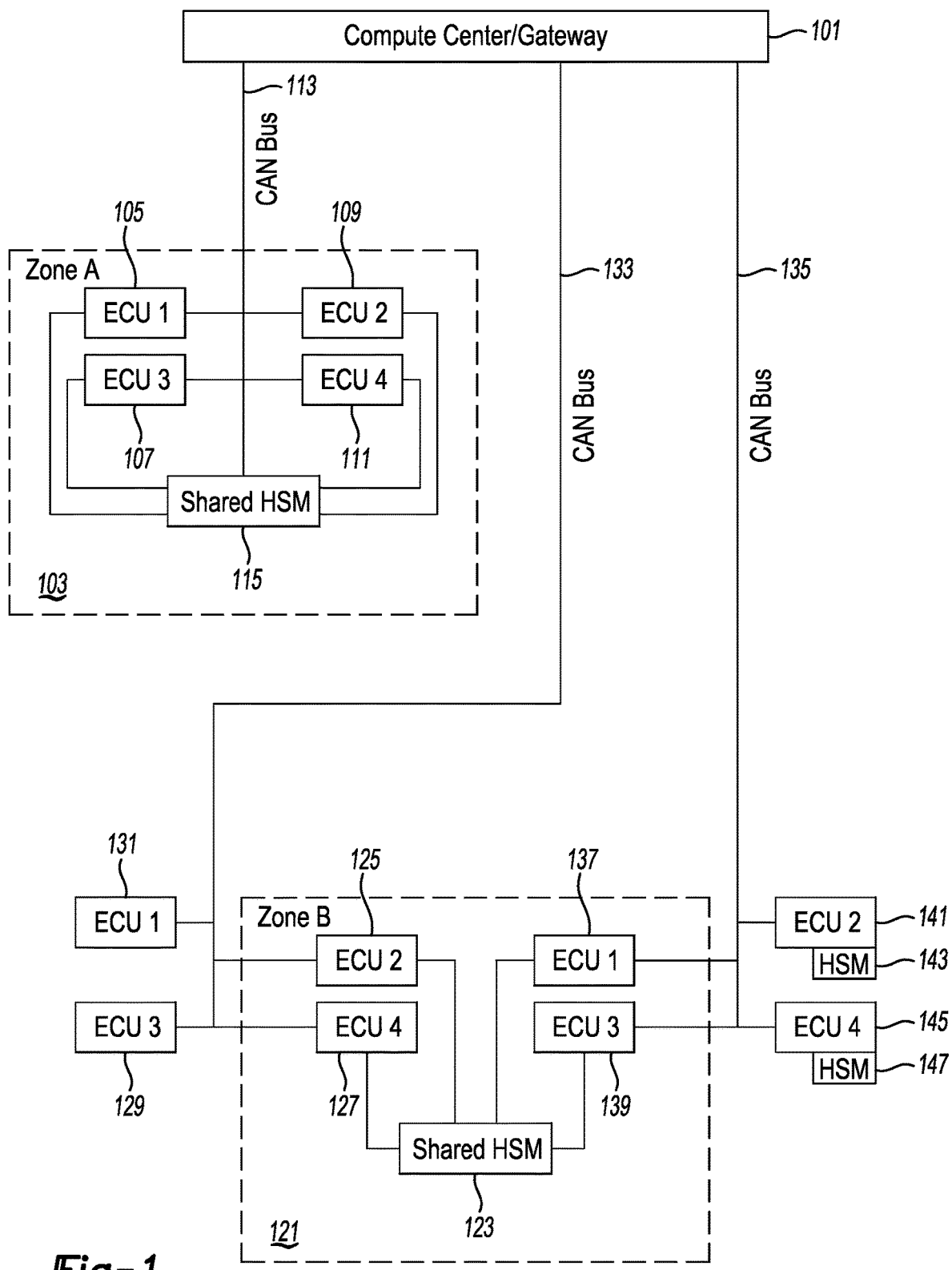
FIG. 1 shows an illustrative sHSM architecture.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments detail an example of a Shared Hardware Security Module (sHSM) architecture where security is offered as a service (SaaS) to the ECUs that are connected to the shared HSM. This solution may help eliminate the need for a 'high performance' HSM embedded into each ECU. This can reduce the per module price of each participating ECU significantly. Each participating ECU can be selected and may only then require very limited security capability—e.g., an ECU with a single AES accelerator.

In this example architecture, the shared HSM offers a great range of its security services to ECUs connected to it. ECUs can be divided based on their zone/location within the vehicle. Each zone has, for example, one high performance HSM that will be shared with multiple ECUs within that zone. The ECUs of each zone may be connected to the shared HSM via a private network (e.g., without limitation, CAN or Ethernet). Communications between an ECU and a shared HSM are not made public in this example.

FIG. 1 shows an illustrative sHSM architecture showing the use of Shared HSMs 115, 123 connected to all ECUs in a given zone 103, 121. Each ECU 105, 107, 109, 111 within Zone-A 103, for example, can make a security service request to its sHSM 103 via a private network. This private network can be encrypted or authenticated before usage. The sHSM 103 will perform the computation needed based on the request and either shares the result back to the 'requestor' and/or sends the result directly on the CAN bus 113 to the subscribers of that message.

FIG. 1 also shows another example where Zone-B 121 has ECUs belonging to different networks 133, 135 (CAN or Ethernet, for example—in this example, CAN). In this case, the sHSM 123 of Zone-B 121 can share the results back to the service requestor, after which the requestor can send out that message via its own bus 133, 135.

This figure also shows ECUs 129, 131, 143, 145 that are not connected to any shared HSMs. Some of these ECUs 143, 145 have their own embedded HSMs (eHSM) to perform any security related tasks, but this may increase the price of these ECUs as well as the space requirements of these ECUSs. The overall price of these ECUs will be greater than those that use the proposed SaaS architecture.

Figure 3:
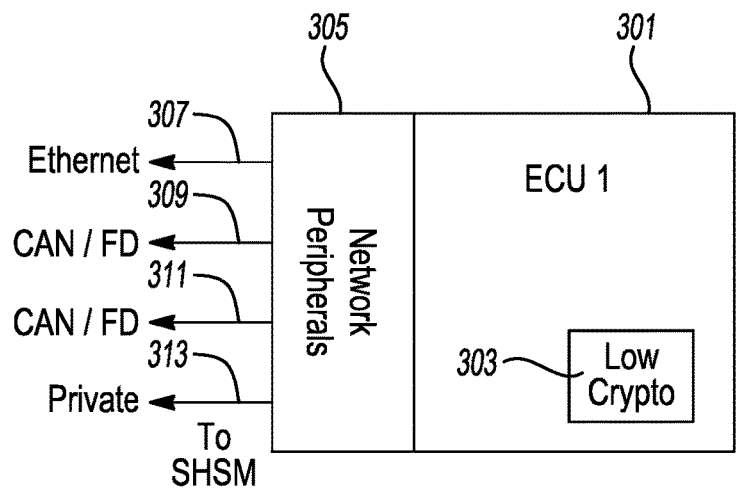
FIG. 3 shows an illustrative participating ECU.
Figure 4:
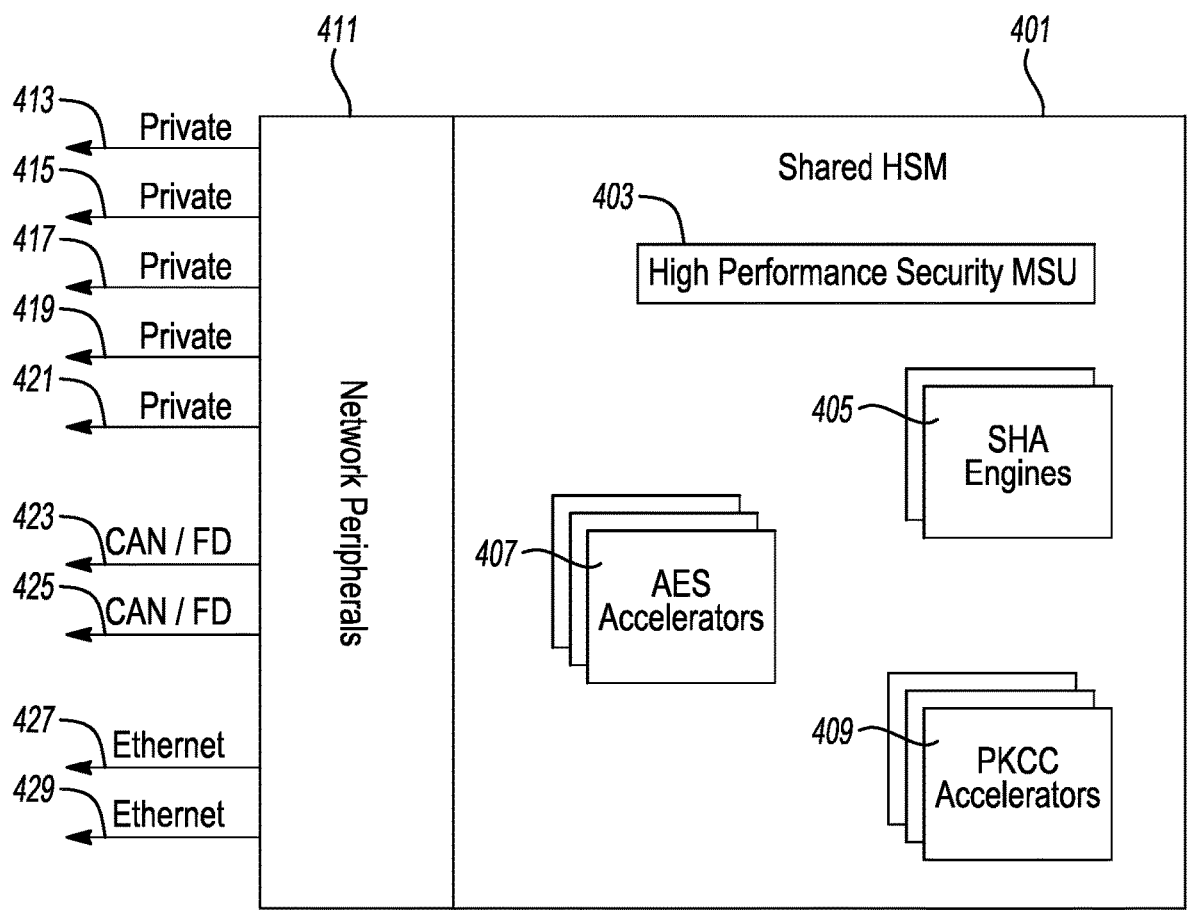
FIG. 4 shows an illustrative sHSM.

In the illustrative example shown, ECUs 105, 107, 109, 111 are assigned to Zone A 103 and all use sHSM 115. Each ECU has a private connection to the sHSM as well as a common connection to CAN bus 113, leading to the compute center 101. As noted above, the sHSM performs all the functions that an onboard (onboard the ECU) HSM would traditionally perform for each ECU. As shown in FIG. 3, the individual ECUs 105, 107, 109, 111 may also have limited onboard security capability, but the primary security functions may be performed by the sHSM as shown in FIG. 4, which has much more security processing capability.

An additional CAN bus 133 provides connections to the compute center for additional ECUs 125, 127, 129, 131. These ECUs include both ECUs 129, 131 not connected to the sHSM through private networks and ECUs 125, 127 that connect to the sHSM 123. The other ECUs may alternatively be connected to an sHSM of another zone (not shown).

A third CAN bus 135 similarly has four illustrative ECUs 137, 139, 131, 145 connected thereto. Two ECUs 137, 139 from this CAN bus also use sHSM 123, and two ECUs 141, 145 have their own onboard HSMs 143, 147. Since those two ECUs 141, 145 have their own HSMs, it is unlikely that they would be connected to an sHSM.

As shown in the diagram, by way of example and not limitation, a single sHSM can service multiple ECU requests, including ECUs connected to varying CAN busses as needed. Even if the sHSM had a higher price or larger footprint than the HSMs of individual ECUs, it does not necessarily need to be co-located (solving space problems) and likely has a lower price than the price of including individual HSMs on every single ECU. Further, any given ECU can be quiescent at any given point in time, allowing for greater efficiency in component utilization by providing an HSM, the sHSM that gets more utilization by dint of having multiple ECUs using the functionality thereof.

Depending on how many ECUs and sHSMs are needed, and the prices of each, it may also be possible to include the sHSM in one ECU if pricing and space permit, and then use the sHSM onboard that particular ECU to service additional requests from other ECUs.

Figure 2:
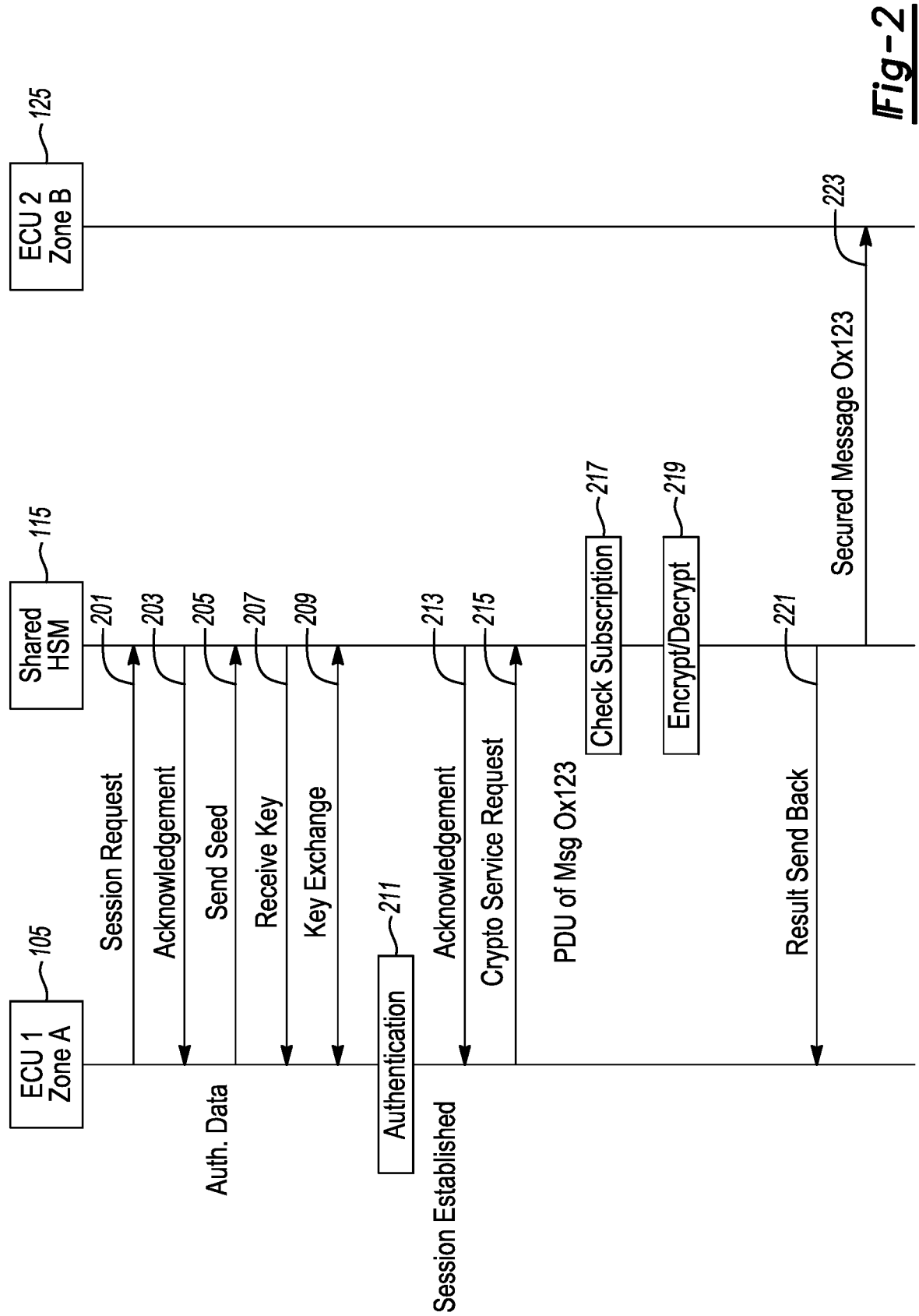
FIG. 2 shows an illustrative sHSM communication protocol.

FIG. 2 shows an illustrative sHSM communication protocol. This example includes ECU 105 from Zone A 103, sHSM 115 and ECU 125 from Zone B 121 in FIG. 1. At the beginning of a session, the ECU 105 attempts to authenticate the sHSM 115 connected thereto using the HSM that is onboard the ECU 105. This is typically a low security HSM in the example given, in order to control the footprint and price of the ECU 105. Authentication, in this example, is done through a challenge and response protocol.

As part of the example protocol, ECU 105 sends a session establishment request at 201 to the sHSM 115 over the private network connection between the ECU 105 and the sHSM 115. This request may include a device-unique UID that is unique to ECU 105. The UID is considered as an immutable root of trust of the ECU, and as such is an unchangeable piece of data from the ECU 105. The sHSM 115 verifies the UID and sends back an acknowledgement at 203. In response to the acknowledgement, the ECU 105 sends a seed for authentication at 205, which is a cryptographic challenge. The sHSM 115 receives the seed and sends back a cryptographic calculation called a key at 207 in response to receipt of the seed. The ECU 105 can then receive the key, verify the seed and the key, and thus authenticate the sHSM at 211.

After the ECU 105 authenticates the sHSM 115, the sHSM 115 can authenticate the ECU 105. This may increase security of authentication but may increase the time for authentication as well. Additionally or alternatively, the authentication session may be followed by a key exchange at 209, which exchanges symmetric keys that can be used to encrypt/authenticate the private channel between the ECU 105 and the sHSM 115.

Once the session has been acknowledged and established at 213, the ECU 105 may send a cryptographic service request at 215. This can be, for example, an encryption, a decryption or an authentication request for handling at the sHSM 115. The message may include, for example, a payload, such as example payload of Msg CAN-ID 0x123.

The sHSM 115 may check for subscription for the message 0x123 at 217. Based on the services requested, the sHSM 115 may start operation on the message 0x123. That is, the sHSM 115 may encrypt, decrypt or authenticate the message at 219, for example. Upon completion, the sHSM 115 may send back the serviced message at 221. For example, the sHSM 115 may send back an encrypted or CMAC version of message 0x123 directly on the CAN network to the subscribers for that message at 223. The subscriber, in this example, is ECU 125. Since ECU 125 also lacks an onboard HSM in this example, ECU 125 can use the sHSM 123 to decrypt the message, following a procedure such as that above. If the ECU 125 had an onboard HSM, such as ECU 141, the onboard HSM could decrypt (or otherwise handle) the message.

As an alternative, following operation on the message 0x123 received from ECU 105, the sHSM 115 can send the serviced message back to the ECU 105 at 221, instead of sending the message 0x123 directly on the CAN bus. This method can be chosen when the sHSM is not on the same sender network as the sender ECU 105 is on, and therefore if the sHSM were to publish the message on a different CAN bus, ECU 125 may not receive the published message, since it would be subscribed to messages on a different CAN bus, subject to the network gateway 101 filtering(that of ECU 105, but not the sHSM, in this example).

FIG. 3 shows an illustrative participating ECU. By way of example, the ECU 301 may be a low/basic performance ECU and have noncomplex EVITA-low equivalent crypto capabilities 303. This would be an example of the ECUs 105, 107, 109, 111 using sHSM 115 and ECUs 125, 127, 137, 139 using sHSM 123. The ECU 301 may have an ethernet connection 307, and one or more CAN/FD connections 309, 311. Additionally, the ECU 301 would include a private connection 313 to the sHSM as part of the network peripheral connections 305.

The ECU 301 may further have a device unique ID (UID) that is tied with its low crypto HSM 303, offering an immutable root of trust.

FIG. 4 shows an illustrative sHSM. The sHSM 401 may include a high performance security MCU 403 providing high performance computations. It may include multiple parallel AES accelerators 407 for encryption and decryption. It may also include multiple SHA engines 405 for hashing and multiple PKA accelerators 409 for Asymmetric crypto operations.

The sHSM may have a number of network peripheral connections 411, and the number of connections, AES, SHA and PKCC cores are understood to be for example purposes only and not limited as shown. The peripheral connections may include a number of private connections 413, 415, 417, 419, 421 for, for example, secure communication with ECUs 301. The sHSM may also have multiple CAN/FD connections 423, 425, as well as multiple ethernet connections 427, 429. As noted above, the sHSM may publish serviced messages directly to a CAN bus 423,425, such as when the sHSM shares a CAN bus with the requesting ECU, or may respond to the requesting ECU with a serviced message so the ECU can publish the message to its respective CAN bus.

The sHSM may include support for the peripherals shown and other peripherals, as well as providing support for PKI (such as RSA-2048, ECC, ECDSA, etc.). It may support multiple crypto instances in parallel, allowing it to service multiple ECU requests in parallel. It may further include lock-step cores if desired.

The proposed architecture and the like, leveraging shared HSMs, may provide savings in both footprint and price compared to individual HSMs included in each ECU. It further may make it easier for software control of the sHSM and work with existing security communication protocols (e.g., CMA, Ethernet security) without requiring any protocol changes. It may help reduce CPU load on end-point ECUs and offer higher cryptographic performance to each ECU when compared to traditional ECUs with embedded HSMs. Further, it may enable ECUs without any considerable onboard security capabilities to participate in secure communication.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
    a plurality of electronic control units (ECUs);
    a shared high security module (sHSM) separate from and connected to the plurality of ECUs over one or more private networks;
    wherein at least one of the ECUs is configured to, over at least one of the plurality of private networks:
        authenticate a session with the sHSM;

request servicing, during the authenticated session and including at least encryption, decryption, or authentication, of a message designated to be handled by the at least one ECU and included in the request for servicing;

wherein the sHSM is configured to:

receive the message and perform the requested servicing of the message using capabilities onboard the sHSM; and publish a serviced version of the message to a designated controller area network bus.

2. The system of claim 1, wherein the at least one ECU is configured to request the session from the sHSM over the at least one private network and wherein the sHSM is configured to send an acknowledgement of the session back to the ECU over the at least one private network.

3. The system of claim 2, wherein the at least one ECU is configured to send a cryptographic challenge to the sHSM, over the at least one private network and responsive to receiving the acknowledgement, and wherein the sHSM is configured to perform a cryptographic calculation based on the cryptographic challenge to produce a first cryptographic calculation result and to return the first cryptographic calculation result to the at least one ECU over the at least one private network.

4. The system of claim 3, wherein the at least one ECU is configured to perform a second cryptographic calculation based on the cryptographic challenge to produce a second cryptographic calculation result and to compare the first cryptographic calculation result, having been received from the sHSM to the second cryptographic calculation result to authenticate the session.

5. The system of claim 1, wherein the sHSM is further configured to co-authenticate the session with the at least one ECU.

6. The system of claim 1, wherein the sHSM is further configured to send the serviced version of the message back to the at least one ECU.

7. A system comprising:

a plurality of electronic control units (ECUs);

a shared high security module (sHSM) connected to the plurality of ECUs over one or more private networks;

wherein at least one of the ECUs is configured to, over at least one of the plurality of private networks:

authenticate a session with the sHSM;

request servicing, during the authenticated session and including at least encryption, decryption, or authentication, of a message designated to be handled by the at least one ECU and included in the request for servicing;

wherein the sHSM is configured to:

receive the message and perform the requested servicing of the message using capabilities onboard the sHSM; and publish a serviced version of the message to a designated controller area network bus.

8. The system of claim 7, wherein the at least one ECU is configured to request the session from the sHSM over the at least one private network and wherein the sHSM is configured to send an acknowledgement of the session back to the ECU over the at least one private network.

9. The system of claim 8, wherein the at least one ECU is configured to send a cryptographic challenge to the sHSM, over the at least one private network and responsive to receiving the acknowledgement, and wherein the sHSM is configured to perform a cryptographic calculation based on the cryptographic challenge to produce a first cryptographic calculation result and to return the first cryptographic calculation result to the at least one ECU over the at least one private network.

10. The system of claim 9, wherein the at least one ECU is configured to perform a second cryptographic calculation based on the cryptographic challenge to produce a second cryptographic calculation result and to compare the first cryptographic calculation result, having been received from the sHSM to the second cryptographic calculation result to authenticate the session.

11. The system of claim 7, wherein the sHSM is further configured to co-authenticate the session with the at least one ECU.

12. The system of claim 7, wherein the sHSM is further configured to send the serviced version of the message back to the at least one ECU.

13. A system comprising:

a plurality of electronic control units (ECUs);

a shared high security module (sHSM) connected to the plurality of ECUs over one or more private networks;

wherein at least one of the ECUs is configured to, over at least one of the plurality of private networks:

authenticate a session with the sHSM;

request servicing, during the authenticated session and including at least encryption, decryption, or authentication, of a message designated to be handled by the at least one ECU and included in the request for servicing;

wherein the sHSM is configured to:

receive the message and perform the requested servicing of the message using capabilities onboard the sHSM; and send the serviced version of the message back to the at least one ECU.

14. The system of claim 13, wherein the at least one ECU is configured to request the session from the sHSM over the at least one private network and wherein the sHSM is configured to send an acknowledgement of the session back to the ECU over the at least one private network.

15. The system of claim 14, wherein the at least one ECU is configured to send a cryptographic challenge to the sHSM, over the at least one private network and responsive to receiving the acknowledgement, and wherein the sHSM is configured to perform a cryptographic calculation based on the cryptographic challenge to produce a first cryptographic calculation result and to return the first cryptographic calculation result to the at least one ECU over the at least one private network.

16. The system of claim 15, wherein the at least one ECU is configured to perform a second cryptographic calculation based on the cryptographic challenge to produce a second cryptographic calculation result and to compare the first cryptographic calculation result, having been received from the sHSM to the second cryptographic calculation result to authenticate the session.

17. The system of claim 13, wherein the sHSM is further configured to co-authenticate the session with the at least one ECU.

18. The system of claim 13, wherein the sHSM is further configured publish a serviced version of the message to a designated controller area network bus.

* * * * *